United States Patent [19]

Tokunaga et al.

[11] 4,243,262
[45] Jan. 6, 1981

[54] REAR WINDOW STRUCTURE FOR AUTOMOBILE

[75] Inventors: Yasuo Tokunaga; Kiyoshige Yamada, both of Hiroshima, Japan

[73] Assignee: Toyo Kogyo Co., Ltd., Hiroshima, Japan

[21] Appl. No.: 959,244

[22] Filed: Nov. 9, 1978

[30] Foreign Application Priority Data

Nov. 11, 1977 [JP] Japan .......................... 52-151786[U]
Nov. 15, 1977 [JP] Japan .......................... 52-153579[U]

[51] Int. Cl.³ .............................................. B60J 1/18
[52] U.S. Cl. ..................................... 296/146; 49/485; 296/215
[58] Field of Search ................... 296/146, 56, 76, 148, 296/137 B; 49/400, 401, 485

[56] References Cited
U.S. PATENT DOCUMENTS

| 2,674,487 | 4/1954 | Wernig | 49/485 |
| 2,739,358 | 3/1956 | Kunkel | 49/488 |
| 2,772,915 | 12/1956 | Renno | 296/146 X |
| 3,678,627 | 7/1972 | Dixon | 49/485 |

FOREIGN PATENT DOCUMENTS 2655990 12/1976 Fed. Rep. of Germany ........... 296/146

*Primary Examiner*—John J. Love
*Assistant Examiner*—Norman L. Stack
*Attorney, Agent, or Firm*—Fleit & Jacobson

[57] ABSTRACT

An automobile rear window structure for closing a rear window opening formed in an automobile body, the opening having front and rear edges and opposite sides. The window closing structure includes a pair of rear pillars extending along both sides of the rear window opening and having trough sections formed therein. Transparent material closing the rear opening includes a rear section and a pair of side sections positioned on opposite sides of the rear section. The side sections have transverse curvatures which are contiguous with a transverse curvature of the rear section. The rear section is formed separately from the side sections and is arranged to cover the rear window opening and has an upper end hinged to the body for swinging movement between closed and open positions. The side sections are secured to the vehicle body at transversely outside portions of the pillars, with edges of the sections extending over the pillars so that the rear section and side sections provide a contiguous contour when the rear section is closed. Seals are provided to ensure water tightness.

3 Claims, 3 Drawing Figures

REAR WINDOW STRUCTURE FOR AUTOMOBILE

The present invention relates to automobile rear window structures and more particularly to automobile rear window structures having openable window sections. More specifically, the present invention pertains to rear window structures having transparent portions curved at the opposite sides to cover rear sideward portions of automobile bodies.

Recently, in order to provide an improved appearance and a good rearward sight, there has been proposed a rear window having a wide transparent glass portion which is curved at the opposite sides thereof to cover rear sideward portions of automobile body. In this type of rear window structure, the transparent glass may be fixed to the automobile body when it is applied to a so-called sedan type car. However, where the rear window structure is applied to a fast-back or lift-back type car, the window glass is mounted on the body for swinging movement between closed and open positions so that it can be used as a trunk lid. In this instance, the automobile body is formed with an opening having peripheral portions provided with sealing members which are adapted to be engaged with corresponding peripheral portions of the window glass. This type of arrangement has been found disadvantageous in respect of sealing functions due to the fact that the window glass is curved at the opposite sides to cover rear sideward portions of the body and therefore it is quite difficult to establish satisfactory sealing engagement between the window glass and the sealing members throughout the peripheral portions thereof. Particularly, at corner portions where the window glass is curved with relatively small radius of curvature, adequate weather-tight seal cannot be provided.

Further, the window glass is of a configuration having complicated curvatures so that it is extremely difficult and expensive to manufacture such a glass in one-piece construction. It should further be noted that such type of window glass is heavy in weight and may cause difficulties in operation.

It is therefore an object of the present invention to provide an openable rear window structure which has a wide transparent portion but can provide a satisfactory weather-tight seal.

Another object of the present invention is to provide an automobile rear window structure which has a wide transparent portion but can readily be actuated to open the same.

A further object of the present invention is to provide an automobile rear window structure which is good in appearance but less expensive in manufacture.

According to the present invention, the above and other objects can be accomplished by an automobile rear window structure comprising rear window opening means formed in an automobile body, transparent means in said window opening means including a rear section and a pair of side sections which are provided at opposite sides of and contiguous with said rear section through portions of curved cross-sectional configurations, said rear section being formed separately from said side sections and mounted on the body for swinging movement between closed and open positions, said side sections being secured to the body, said rear section having peripheral edges adapted to be placed substantially flush with adjacent peripheral edges of the side sections, seal means provided along said peripheral edges for providing weather-tight seal along gaps between the peripheral edges on the rear section and those on the side sections. Preferably, the seal means is provided on trough members secured to the side sections along the peripheral edges. The trough members may be in the form of rear pillars of the automobile body and the rear and side sections may be applied with coatings of black or any other colour along the peripheral edges so that the sealing means is covered by the coatings and prevented from being observed from outside.

The arrangement of the present invention is preferable in that the movable part, that is, the rear section of the transparent means is of a relatively light weight so that it can be handled very easily. Further, the rear section as well as the side sections are of comparatively simple configurations and can be manufactured with less expense. Since the rear section is flush with the side sections at the peripheral edges, the transparent means provides an appearance as if the rear and side sections are formed in one-piece.

The above and other objects and features of the present invention will become apparent from the following descriptions of a preferred embodiment taking reference to the accompanying drawings, in which.

Figure 1:
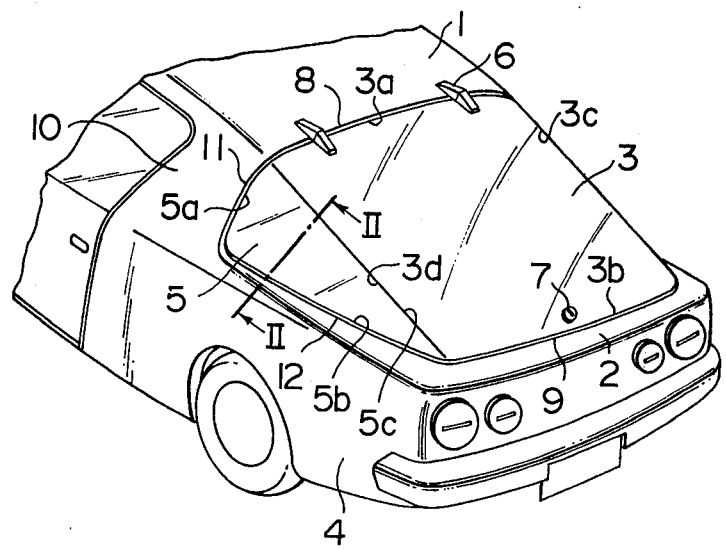
FIG. 1 is a fragmentary perspective view of an automobile rear portion showing one embodiment of the present invention.

Referring now to the drawings, particularly to FIG. 1, the automobile shown therein includes a body comprising a roof 1 and a rear frame 2 including rear fenders 4 which are connected with the roof 1 by means of a pair of center pillars 10 to provide a rear window opening defined by upper and lower edges 8 and 9 and front and side edges 11 and 12. In the rear window opening, there are disposed rear and side transparent glass sections 3 and 5. The rear glass section 3 is of a substantially rectangular shape and mounted at the upper edge 3a on the body through hinges 6 so that it can be moved between open and closed positions.

As shown in FIG. 1, the rear glass section 3 extends in the closed position obliquely from the roof 1 to the rear frame 2 with the lower edge 3b positioned adjacent to the lower edge 9 of the window opening. Although not shown in the drawings, appropriate sealing members are provided along the edges 8 and 9 of the window opening for sealing engagement with the rear section 3. A lock assembly of any known construction may be provided for locking the section 3 in the closed position.

Figure 2:
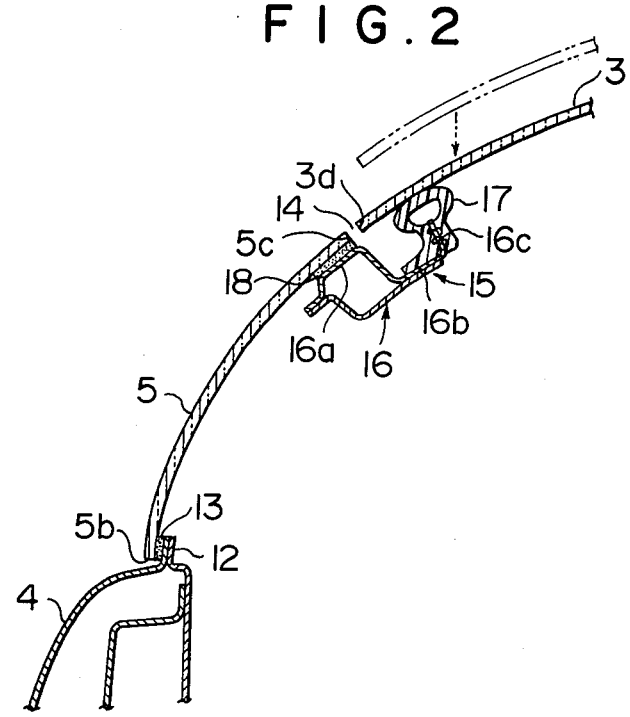
FIG. 2 is a sectional view taken substantially along the line II—II in FIG. 2; and, FIG. 3 is a perspective view showing one example of rear frame structure.

The side glass sections 5 are positioned at the opposite sides of the rear section 3 and secured to the body. The side section 5 is of a substantially triangular shape having a front edge 5a, a lower edge 5b and an upper edge 5c. As shown in FIG. 2, the side section 5 is attached at the lower edge 5b to the side edge 12 by means of an adhesive 13. Similarly, the front edge 5a of the side section 5 is adhesively attached to the front edge 11.

The upper edges 5c of the side sections 5 are respectively positioned adjacent to side edges 3c and 3d of the rear section 3. As shown in FIG. 2, the side edge 3d of the rear section 3 is flush with the upper edge 5c of the side section 5 when the rear section is in the closed position. Although not shown, the other side edge 3c of the rear section 3 is also flush with the upper edge of the adjacent side section 5. Between the side edge 3c or 3d of the section 3 and the upper edge 5c of the side section 5, there is formed a gap 14 which may suitably be about 5 6 mm wide.

Figure 3:
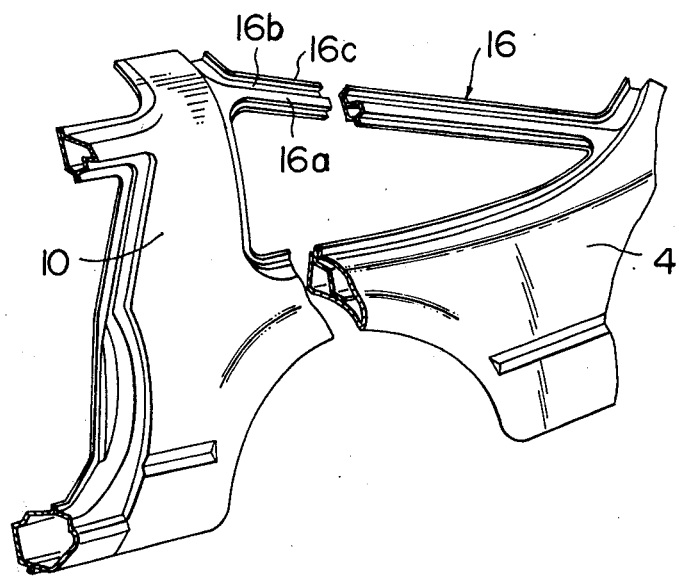

At the inner surface, the side section 5 is attached along the upper side 5c to a rear pillar 16 by means of an adhesive 18. As shown in FIG. 3, the rear pillar 16 extends between the roof 1 and the rear frame 2 at each side of the body. The rear pillar 16 has a flat section 16a adapted to be adhesively attached to the side section 5 and a trough section 16b defined between the flat section 16a and an upright edge portion 16c. A sealing member 17 is mounted on the edge portion 16c of the rear pillar 16 so as to constitute a seal assembly 15 together with the rear pillar 16. The sealing member 17 is engaged with the inner surface of the rear section 3 when the latter is in the closed position. Similar troughs may be provided along the upper and lower edges 8 and 9 of the window opening and may be formed continuous with the troughs 16b along the upper edges 5c of the side sections 5 so that rain water may flow down along the continuous trough arrangements.

It will thus be understood that, in the above described rear window structure, the junction between the adjacent edges of the rear and side sections can be adequately sealed by the sealing member 17. Any rain water which may pass through the gap 14 is directed downwards through the trough 16b so that there is no risk of water being allowed to enter the inside of the body. Further, it should be noted that, when the rear section 3 is moved from the open position to the closed position, it moves in the direction as shown by an arrow in FIG. 2 and is brought smoothly into sealing engagement with the sealing member 17. Thus, a satisfactory weather-tight seal can always be provided without fail.

It is preferable to coat the rear pillars 16 with a black or other suitable colour so that the metallic glazing of the pillars 16 are not observed from the outside. Alternatively, the glass sections 3 and 5 may be coated at the inner surfaces with such paint along the edges 3c, 3d and 5c.

The invention has thus been shown and described with reference to a specific arrangement, however, it should be noted that the invention is in no way limited to the details of the illustrated structures but changes and modifications may be made without departing from the scope of the appended claims.

We claim:

1. Automobile rear window structure comprising rear window opening means formed in an automobile body and having front and rear edges and opposite sides, a pair of rear pillar means extending along said sides of said rear window opening means and respectively having trough sections, transparent means in said window opening means including a rear section and a pair of side sections at the opposite sides of the rear section, said side sections having transverse curvatures which are contiguous with a transverse curvature of said rear section, said rear section being formed separately from said side sections and arranged to cover said opening means with an upper edge hinged to the body at the front edge of the opening means for swinging movement between closed and open positions, said side sections being secured to the body at transversely outside portions of said rear pillar means with said edges located to extend over the rear pillar means so that said rear section and the side sections provide a contiguous contour when the rear section is in the closed position, seal means provided along said trough section of the rear pillar means for providing weathertight seal along the sides of the opening means.

2. Automobile rear window structure in accordance with claim 1 in which said side and rear sections are coated with paint along said peripheral edges.

3. Automobile rear window structure in accordance with claim 1 or 2 in which said rear pillar means is coated with paint.

* * * * *